United States Patent [19]

Fuller

[11] Patent Number: 5,675,731
[45] Date of Patent: Oct. 7, 1997

[54] SCATTER LOAD FOR SYSTEM TEST

[75] Inventor: Billy J. Fuller, Colorado Springs, Colo.

[73] Assignee: Sun Microsystems, Inc., Mountain View, Calif.

[21] Appl. No.: 532,531

[22] Filed: Sep. 22, 1995

[51] Int. Cl.[6] .................................................. G06F 11/00
[52] U.S. Cl. ..................................... 395/183.14; 371/27
[58] Field of Search .................. 395/183.14, 183.13, 395/183.15, 183.06, 184.01, 183.22, 183.08, 183.09; 371/27

[56] References Cited

U.S. PATENT DOCUMENTS

| 5,390,325 | 2/1995 | Miller | 395/183.14 |
|---|---|---|---|
| 5,414,836 | 5/1995 | Baer et al. | 371/3 |
| 5,440,697 | 8/1995 | Boegel et al. | 395/500 |
| 5,485,610 | 1/1996 | Gioielli et al. | 395/600 |
| 5,500,941 | 3/1996 | Gil | 395/183.14 |
| 5,513,315 | 4/1996 | Tierney et al. | 395/182.08 |
| 5,542,043 | 7/1996 | Cohen et al. | 395/183.08 |

OTHER PUBLICATIONS

Woit, "A Framework for Reliability Estimation", IEEE, 1994 Software Symposium, pp. 18–24 1994.

Schneidewind, "Validating Software Metrics: Producing Quality Discriminators", IEEE, Software Reliability Engineering, 1991 Symposium, pp. 225–232. 1991.

Munson et al., "The Use of Software Complexity Metrics in Software Reliability Modeling", IEEE, Software Reliability engineering, 1991 Symposium, pp. 2–11. 1991.

Hamlet., "Are We Testing for True Reliability?", IEEE Software, vol. 9, Iss. 4, Jul. 1992, pp. 21–27. 1992.

Weyuker et al., "Analyzing Partition Testing Strategies", IEEE Trans. on Software Engineering, vol., 17, Iss. 7, Jul. 1991, pp. 703–711. 1991.

Chen et al., "On the Relationship Between Partition and Random Testing", IEEE Trans. on softwrae Engineering, vol. 20, Iss. 12, Dec. 1994, pp. 977–980. 1994.

Deason et al., "A Rule Based Software Test Data Generator", IEEE Trans. on Knowledge and Data Engineering, vol. 3, Iss. 1, Mar. 1991, pp. 108–117. 1991.

*Primary Examiner*—Robert W. Beausoliel, Jr.
*Assistant Examiner*—Joseph E. Palys
*Attorney, Agent, or Firm*—William J. Kubida; Homer L. Knearl; Holland & Hart LLP

[57] ABSTRACT

Software systems such as file systems in a computer are tested by scatter load testing. Scatter load testing is accomplished by the computer system applying randomly selected operative test situations to the software system. The operative test situations are randomized by the computer randomly selecting a geometry, or configuration, for the software system under test and randomly selecting a workload on the selected software system configuration. The randomization of workload selection can be further enhanced by expanding the workload to one or more tasks and randomly selecting objects, actions and parameters that make up each workload task to be performed during the test. As the random operative situation is run on the system, operation test results are output from the computer to indicate the performance of the software system being tested. Choice constraints may be placed on the random selection of the various test elements of the operative test situation. Each choice of software system configuration, workload, and operations and parameters within a workload task may be compared against constraints for these test elements. Thus, the testing may be constrained to randomly select only operative test situations that are useful and effective test situations within a test sub-domain of a larger test domain containing all possible operative test situations.

30 Claims, 4 Drawing Sheets

SCATTER LOAD FOR SYSTEM TEST

FIELD OF THE INVENTION

This invention relates to scatter loading operative situations on a software system in a computer for the purpose of testing the software system's operability with the computer. More particularly, the invention relates to testing a software system over a spectrum of randomly selected software system configurations with a spectrum of randomly selected workloads.

DESCRIPTION OF PROBLEM

When a new software system, as for example a new file system, has been developed, the system is tested in multiple operative situations before the software system is shipped to customers. If the software system is complex, there may be millions of operative situations that could be tested for a full complete test of the software system. An operative situation in the case of a software file system is not simply a given single task being performed by the file system but is rather such a task in combination with other possible tasks that may be performed on the system in parallel with the given task. Further, the operative situation changes with the history of what has already been done on the file system. Accordingly a test process for the software system should include millions of operative situations; however, such a test process is not practical. For example, it could take as much as five man years just to create the millions of operative situations that could occur on a UNIX file system.

Accordingly, there is a need in the development of complex software systems for a method or apparatus for testing a new complex software system in a manner that reduces the likelihood of faults occurring in all operative situations for the system while minimizing the operative situations actually used in the test of the system and maximizing the number of useful or effective operative situations used in the test.

SUMMARY OF THE INVENTION

In accordance with this invention, the above problem has been solved by generating a random operative test situation for the software system, running the operative test situation on the software system and repeating the generating and running steps to obtain a distribution of operative test situations over a domain of all possible operative test situations for the software system. The invention is further enhanced by detecting whether the operative test situation is within predetermined test constraints and then repeating the generation of the operative test situation if the test situation is not within test constraints. In this way the operative test situations are distributed over test sub-domains of possible operative test situations within a test domain containing all possible test situations for the software system.

Apparatus for scatter load testing a file system in a computer with random workloads has a random test generating module for randomly generating a file system configuration and a plurality of operative tasks as a test workload for the file system and a test run module for running the plurality of operative tasks as the test workload for the file system. The test run module runs a plurality of the test workloads. A detector detects whether each operative task is within predetermined test constraints. The random test generating module responds to generate a replacement operative task for each operative task that the detector detects is not within test constraints.

The detector is implemented as one or more of the following detectors. The detector can be a configuration detector which causes a configuration generating module to generate a replacement file system configuration for each file system configuration that said configuration detector detects is not within test constraints. The detector can be an operative task detector which causes a set selector module to select a new random set of operative tasks to run on the file system configuration as the test workload when the operative task detector detects the random set is not within test constraints and sets a failure indicator picked up by the set selector module.

The inventive process includes the computer implemented steps of generating a random geometry for the software system to produce a software system configuration for testing; generating a random workload for the software system configuration as an operative test situation; and running the random workload to provide a test result output for each operative test situation.

As a further feature of the invention the process detects whether the software system configuration is within test constraints and repeats generation of the software system configuration if the detected configuration is not within test constraints. Also the step of generating a random workload is accomplished by selecting a random set of workload operations. Thereafter the process detects whether the random set of workload operations is within test constraints and repeats generation of the random set of operations if the set is not within test constraints.

As a further feature of the invention, the random workload is run by selecting a random operation to be performed by the software system configuration; executing the random operation; and repeating the selecting and executing steps until enough operations have been run to complete the workload. The selecting step is accomplished by selecting a file system object, selecting an action to be performed on the file system object, selecting action parameters for the action to be performed, and issuing the random operation to the processor. Before issuing the random operation, the process also includes detecting whether the random operation is within predetermined test constraints, and repeating all of these selecting steps until said detecting step detects the workload operation is within the predetermined test constraints.

The invention is particularly useful in testing the operability of a complex software file system, such as those file systems operating in a UNIX environment. A file system tested and debugged with the present invention is very likely to have a very low error rate when testing is completed.

The great advantage of this invention is that complex software systems may be tested by the computer system in a reasonable amount of time, and the test is well balanced to produce a high quality software system product. The foregoing and other objects, features and advantages of the invention will be apparent from the following more particular description of a preferred embodiment of the invention as illustrated in the accompany drawings.

DETAILED DESCRIPTION

Figure 1:
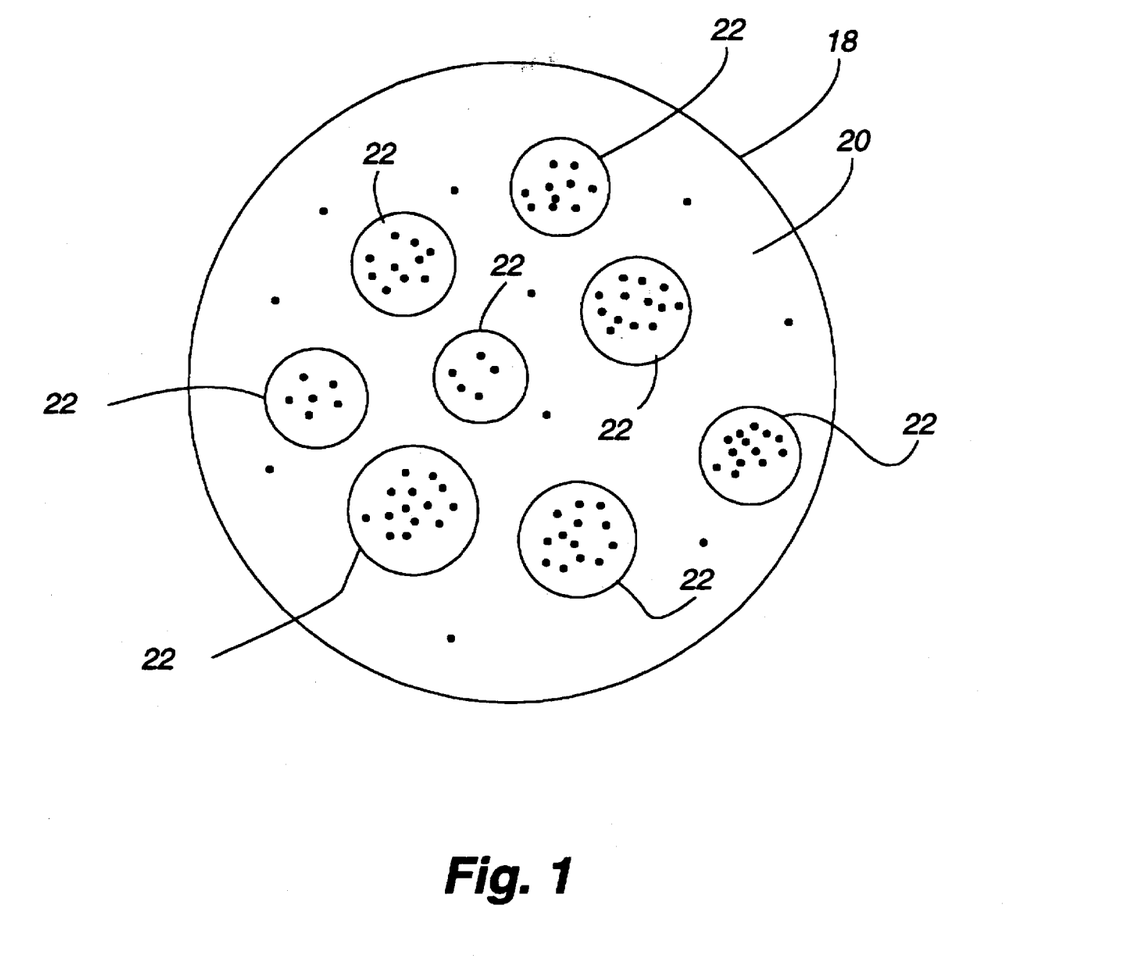
FIG. 1 is a scatter diagram illustrating the testing theory behind the invention.

FIG. 1 is a scatter diagram where the outside circle 18 represents the outer boundary of a test domain 20 that would include all possible operative test situations for a file system. Each dot or test point within the large circle 18, i.e in domain 20, represents an operative test situation for the file system. By randomly generating operative test situations, one can get a uniform distribution of test points for the file system within the test domain 20. However, there are certain test points which would be of no interest and others that would be more effective and useful. For example, testing the opening of a file that doesn't exist is a non-interesting operative test situation within domain 20. On the other hand, testing the reading of one file while writing another file might be a highly probable and useful operative test situation. Accordingly, it is possible to define test sub-domains 22 within the larger test domain 20 that represent the more relevant test situations.

In the preferred embodiment of the invention, these test sub-domains are defined by putting constraints on the random generation of the operative test situations. The operative test situations are still randomly generated, but if the test situation generated does not fit certain criteria within the constraint, then the test situation is thrown away, and a new random test situation is generated. This will tend to produce uniform distribution of operative test situations within test sub-domains 22.

Figure 2:
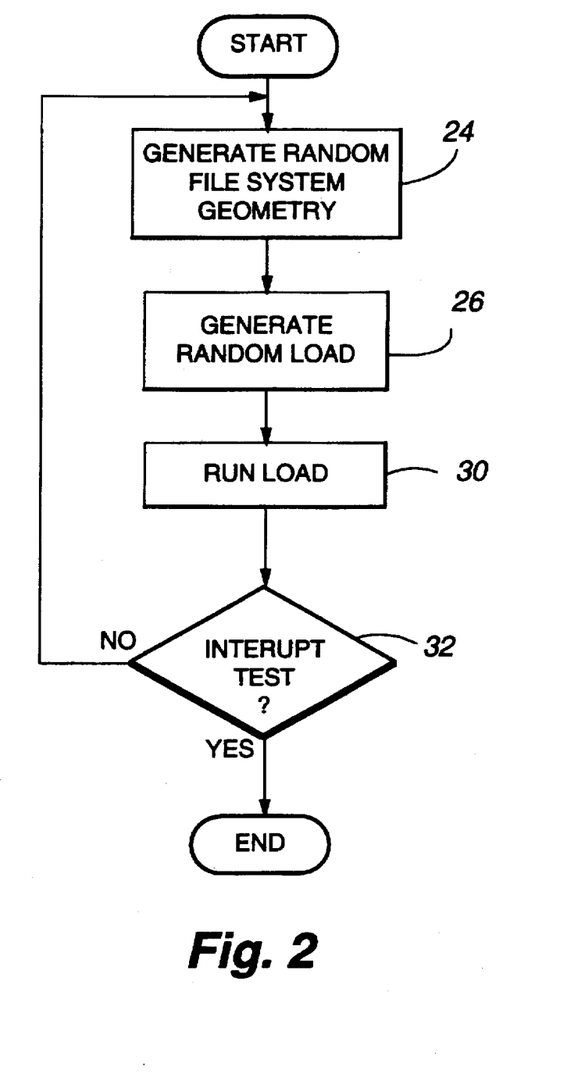
FIG. 2 shows the flow of logical operations or process steps that are fundamental to the preferred embodiment of the invention.

FIG. 2 illustrates the basic logical operations performed to implement the preferred embodiment of the invention. Operation 24 generates the random geometry to define the file system configuration for the operative test situation. After the parameters of the file system are defined, step 26 generates a random workload for the file system. A random workload is made up by generating a random number of workload tasks to be run in parallel by the software system on the computer and by generating a random number of operations per workload task.

After the workload is defined by step 26, logical operation 30 runs the workload tasks in parallel. The operations in each workload task are randomly generated as each task is run. Operations in a workload task would include random selections from all of the possible file system objects, actions and action parameters. Some examples for objects might be directory, file, etc., while examples of actions would include read, write, move, delete, etc. In combination with these action items, there would be related action parameters including, for example, read only mode, number of bytes, etc. As each object, action and parameter is selected, the randomly generated operation runs. When the run load module 30 finishes executing the random workload generated by step 26, decision operation 32 then checks to determine whether an interrupt of the test has been received. If the file system test is not interrupted, the process flow returns to generate a new random file system geometry at operation 24. If the scatter load test is interrupted, then the process branches from decision operation 32 to return control to the operating environment.

The operating environment, in which the present invention is used, encompasses the general distributed computing system, wherein general purpose computers, workstations, or personal computers are connected via communication links of various types, in a client-server arrangement, wherein programs and data, many in the form of objects, are made available by various members of the system. Examples of general distributed computing systems include SPARC systems offered by Sun MicroSystems, Inc., client-server systems configured from personal computers offered by IBM Corporation and by other manufacturers of IBM-compatible personal computers, and systems running the UNIX operating system.

Figure 3:
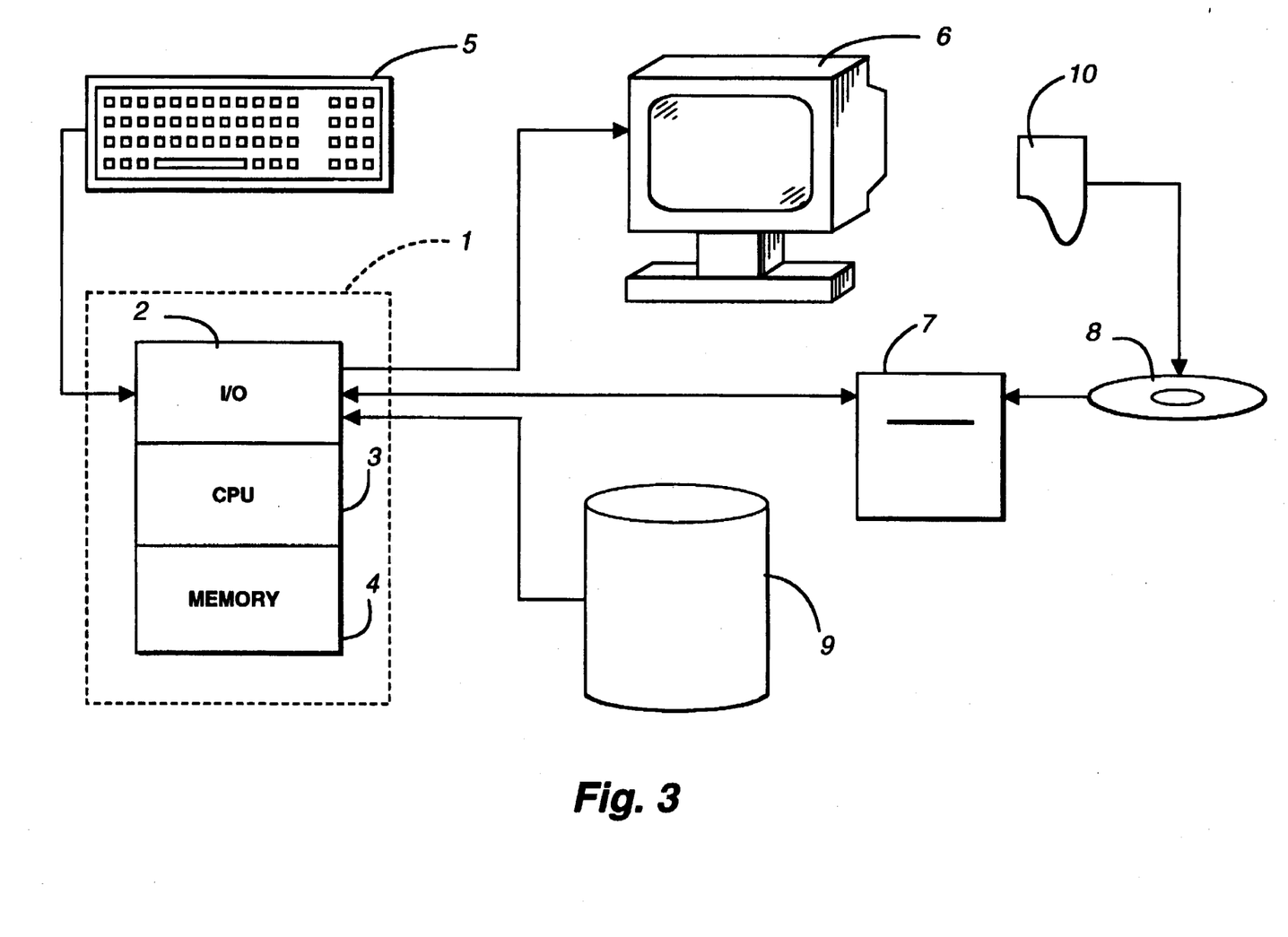
FIG. 3 illustrates a computer operating environment to perform the mechanisms of the apparatus or method steps of the invention.

Some of the elements of a general purpose workstation computer are shown in FIG. 3, wherein a processor 1 is shown, having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system.

Figure 4:
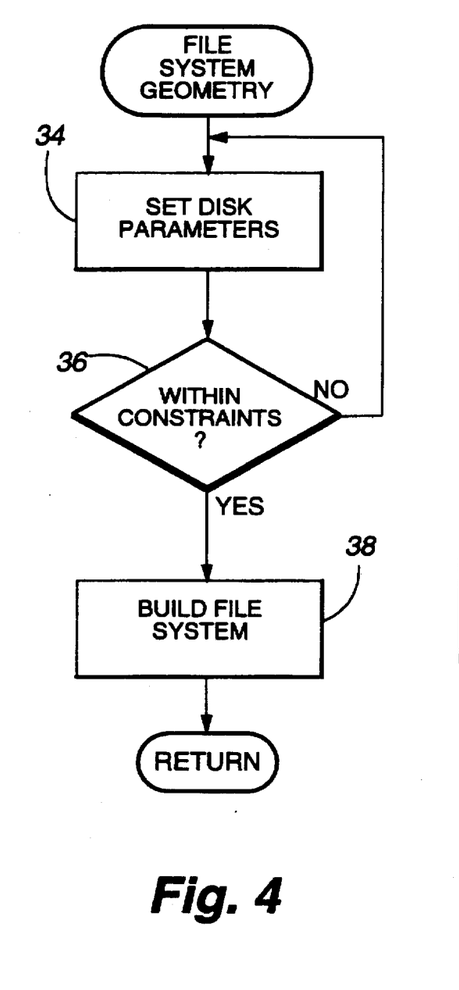
FIG. 4 shows the flow of logical operations performed by the generate random geometry module 24 of FIG. 2.

In FIG. 4, the preferred embodiment for generating the random geometry or configuration of the file system is illustrated. Operation 34 starts the process by setting the disk parameters. These parameters would include size or capacity of the file, the number of cylinders per group in the file, the cylinders in a group, the sectors per track, and the tracks per cylinder. After the disk parameters for the file system have been set, decision operation 36 tests whether the parameters that have been randomly set by the processor are within constraints. As discussed earlier with regard to FIG. 1, the purpose of the constraints is to set a sub-domain of test situations. The constraints might be such that the parameter definitions are limited to real possible definitions, are limited to typical user defined parameters, are directed to network defined parameters, etc. Such criteria for setting constraints to be used by decision step 36 are defined by the user.

If the disk parameters are within constraints, the process branches yes from decision operation 36 to build file system operation 38. Operation 38 uses the parameters defined by the set disk parameters 34 to configure the file system to be used in the operative test. After operation 38, the program flow proceeds to the generate random load operation 26 in FIG. 2 which is detailed in FIG. 5.

Figure 5:
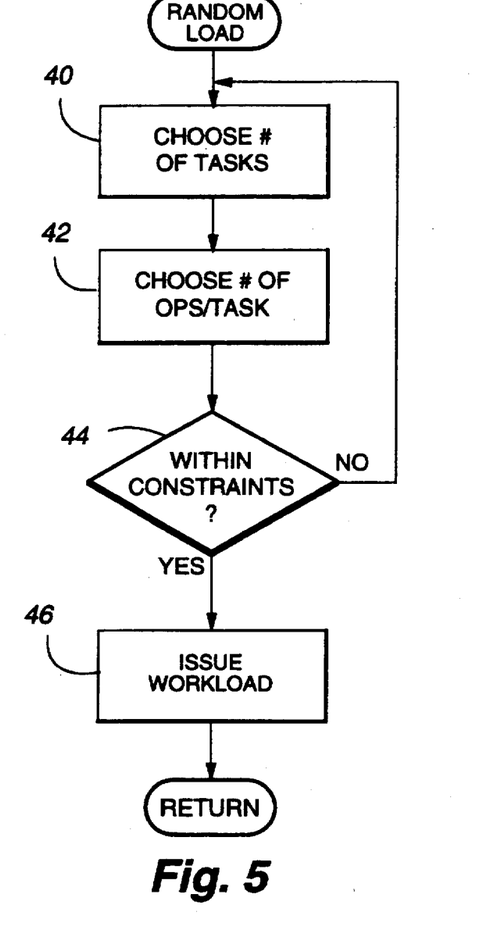
FIG. 5 illustrates the flow of logical operations performed by the generate random load module 26 of FIG. 2.

In FIG. 5, the workload generation operation begins by operation 40 choosing the number "m" of tasks that make up the workload. Operation 42 chooses the number "n" of operations per task in the workload. With the number of tasks selected and the number of operations per task selected, decision operation 44 tests whether the workload defined by operations 40 and 42 is within constraints. Again, the workload constraints may be preset to define the more relevant operative test situations.

The criteria for setting constraints to be used by decision step 44 are set by the user. The constraints could define test sub-domains that reflect operative test situations that (1) have a high probability of actual use, i.e. represent a common load for the file system, (2) that are rare but provide useful information about the file system, (3) that are stressful to the file system such as use of a single file or single directory by multiple parallel tasks, and (4) that provide information about error paths and effectiveness of error recovery. This is not an exhaustive list of test sub-domains, and other desirable test sub-domains may be defined by the user setting the constraints.

If the constraints have been satisfied, the process for generating the workload is complete and the process returns to run load module 30 in FIG. 2 to generate and run the random operations within each task of the workload. If the workload is not within constraints, then the process flow returns to operation 40 to begin selection of another random workload.

Figure 6:
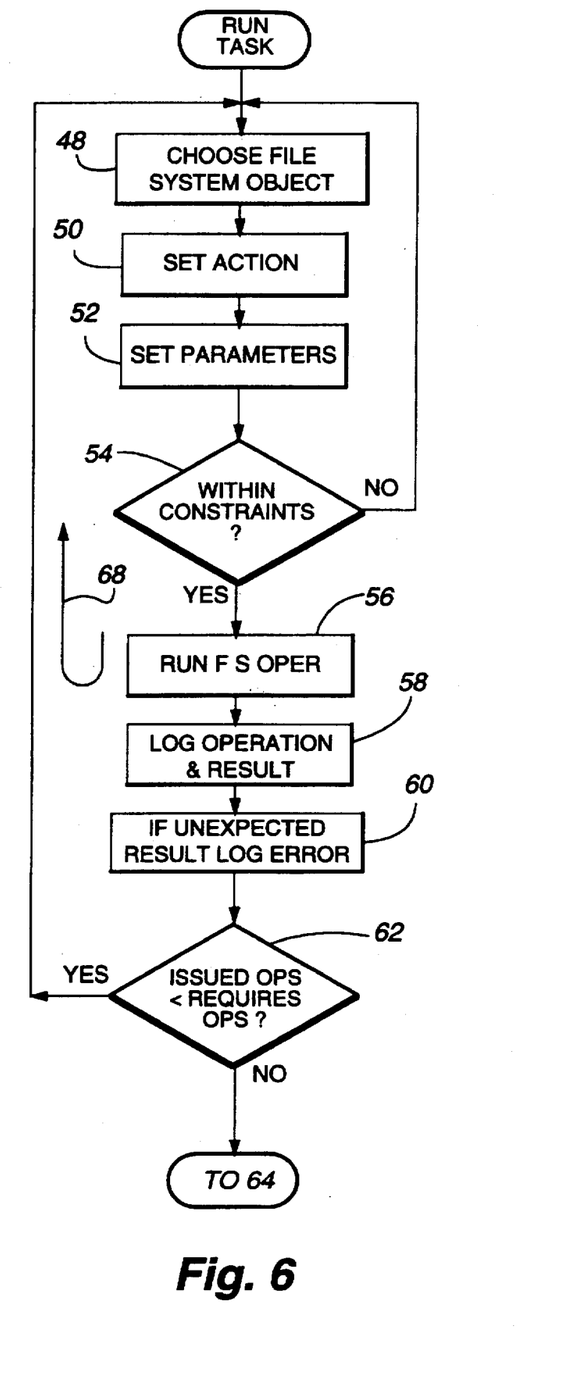
FIG. 6 shows the flow of logical operations performed in executing a workload task.

In FIG. 6, the run workload task process starts at step 48 where the processor chooses a file system object for the first action to be performed as a part of the workload task. Examples of file system objects are directories and files. After the file system object is selected in step 48, step 50 randomly sets the action to be performed on the file system object. The parameters of the action set by step 50 are set in set parameters step 52. Steps 50 and 52 for a "directory" object might set as the action/parameter "delete/all files."

Decision operation 54 tests whether the object, action and parameter of the operation in the workload task are within constraints. The criteria for setting constraints to be used by decision step 54 are the same as previously discussed for setting constraints used by decision step 44 in FIG. 5. If object, action and parameters are not within constraints, the process returns to operation 48 to randomly choose another file system object. The action and parameters are again set for the file system object newly chosen, and decision operation 54 again tests whether the file system object, action and parameters are within constraints.

When the object, action and parameters are within constraints, the process branches to step 56. Step 56 then runs the file system operation just randomly generated by steps 48, 50 and 52. After the file system operation is run, step 58 logs the file system operation and the results of that operation. Step 60 further sets a log error if the result in step 58 is unexpected.

Decision step 62 then tests to see if the number of issued operations, i.e., the number of file system operations run, is less than the required operations per task defined for the workload in step 42 of FIG. 5. If the number of issued operations is less than the number of required operations, the process flow branches "Yes" and returns to operation 48 to select the next random file system operation to be run as part of the workload task. Process loop 68 now continues to run until the number of issued operations is not less than the number of required operations. In other words all the file system operations in a workload task have been completed, and therefore, one of the workload tasks has been completed. The process branches "No" from decision step 62 to decision step 64 in FIG. 7.

Figure 7:
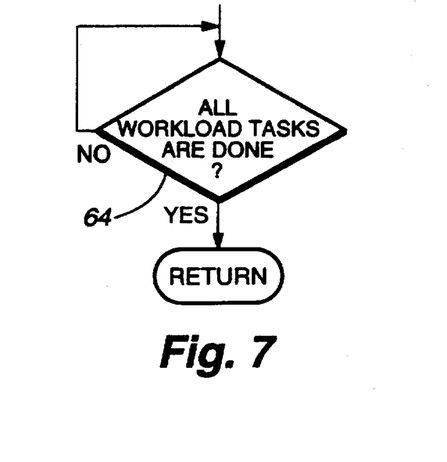
FIG. 7 is a wait loop monitoring the completion of all workload tasks.

Decision operation 64 in FIG. 7 tests whether all workload tasks are done. Since the workload tasks are running in parallel, the run task process in FIG. 6 exists for each workload task in the number of tasks randomly generated by step 40 in FIG. 5. FIG. 7 is a wait loop monitoring all the workload tasks. Each of these parallel tasks when completed branches to decision step 64 in FIG. 7 as indicated in FIG. 6. When all tasks have run, decision step 64 operates as a test workload detector to detect that the run load operation 30 (FIG. 2) is complete. The process branches "No" from decision operation 64. Program flow returns to the interrupt test decision operation 32 in FIG. 2 to detect whether the test is to be interrupted.

The testing of the file system can be initiated and left to run until a user chooses to interrupt the test. The beauty of the test is that the random generation of the operative test situations will distribute the test points over the test domain 20. Further when the user sets constraints, decision steps 36 (FIG. 2), 44 (FIG. 5) and 54 (FIG. 6) are used to restrain the distribution of test points within test sub-domains 22 of primary interest.

While the invention has been particularly shown and described with reference to a preferred embodiment thereof, it will be understood by those skilled in the art that various other changes in the form and details may be made therein without departing from the spirit and scope of the invention.

What is claimed is:

1. In a computer having a software system, a method for scatter load testing the software system in test subdomains inside a test domain containing all possible configurations and operative test situations for the software system, said method comprising the computer implemented steps of:

(A) generating a random geometry for the software system to produce a software system configuration for testing;

(B) generating a random workload for the software system configuration, said random workload and said software system configuration together defining an operative test situation;

(C) running the random workload on the software system configuration and providing a test result output for each operative test situation;

(D) detecting whether the operative test situation is within test constraints defining a test subdomain with the test domain; and (E) repeating step (B) if step (D) detects the operative test situation is not within the test constraints.

2. The method of claim 1 and in addition the steps of:

(F) detecting whether the software system configuration is within configuration test constraints further defining the test subdomain within the test domain;

(G) repeating step (A) if step (F) detects the software system configuration is not within configuration test constraints.

3. The method of claim 1 wherein step (B) further comprises the step of:

(H) selecting a random set of workload operations as the random workload.

4. The method of claim 2 and in addition the steps of:

(I) detecting whether the random workload is within operative test constraints further defining the test subdomain within the test domain;

(J) repeating step (B) if step (I) detects the random workload is not within the operative test constraints.

5. In a computer having a software system, a method for scatter load testing the software system, said method comprising the computer implemented steps of:

(A) generating a random geometry for the software system to produce a software system configuration for testing;

(B) generating a random workload for the software system configuration, said random workload and said software system configuration together defining an operative test situation;

(C) running the random workload on the software system configuration and providing a test result output for each operative test situation;

(D) choosing a random number "m" of tasks to be performed by the selected software system configuration;

(E) choosing a random number "n" of operations to be performed per task; and (F) selecting a random set of "n" operations for each task.

6. The method of claim 5 wherein step (F) comprises the steps of:

(G) selecting a random operation to be performed by the selected software system configuration;

(H) executing the random operation; and (I) repeating steps (G) and (H) until step (H) has run "n" operations.

7. The method of claim 6 wherein step (G) comprises the steps of:

(J) selecting a file system object;

(K) selecting an action to be performed on the file system object;

(L) selecting action parameters for the action to be performed on the file system object to complete selection of a random operation; and (M) issuing the random operation.

8. The method of claim 7 and in addition the steps of:

(N) prior to step (M), detecting whether the random operation is within predetermined test constraints;

(O) repeating said steps (J), (K) and (L) until said detecting step detects the workload operation is within the predetermined test constraints.

9. In a computer having a software system, a method for scatter load testing the software system, said method comprising the computer implemented steps of:

(A) generating a random geometry for the software system to produce a software system configuration for testing;

(B) generating a random workload for the software system configuration, said random workload and said software system configuration together defining an operative test situation;

(C) running the random workload on the software system configuration and providing a test result output for each operative test situation; and said step (A) comprises the steps of:

(D) setting parameters for the software system configuration to a random set of parameters;

(E) detecting whether the random set of parameters is within test constraints;

(F) building the software system configuration from the random set of parameters if step (E) detects the disk parameters are within test constraints;

(G) if step (E) detects the random set of parameters is not within test constraints, repeating steps (D) and (E) until step (E) detects a random set of parameters is within test constraints.

10. Apparatus for scatter load testing a file system in a computer with random workloads, the computer having a processor, a keyboard, and a plurality of data storage devices, said file system operating the processor and controlling the plurality of data storage devices, said processor having a central processing unit, memory and input/output control, said input/output control connected to the keyboard and data storage devices, said apparatus comprising:

random test generating module for randomly generating a file system configuration and a plurality of operative tasks for the file system configuration as a test workload for the file system;

test run module for running the plurality of operative tasks in parallel on the file system configuration as the test workload for the file system;

said random test generating module repeatedly generating test workloads and said test run module running the test workloads as they are generated in order to scatter load the file system with a random distribution of test workloads over a test domain of all possible test workloads for the file system.

11. The apparatus of claim 10 and in addition:

a detector for detecting whether each operative task generated by said random test generating module is within predetermined test constraints;

said random test generating module responsive to said detector for generating a replacement operative task for each operative task that said detector detects is not within test constraints whereby the test workloads are distributed over test sub-domains including only a predetermined portion of all possible test workloads for the file system.

12. The apparatus of claim 10 said random test generating module further comprises:

a configuration detector for detecting whether the file system configuration is within predetermined test constraints;

a configuration generating module responsive to said detector for generating a replacement file system configuration for each file system configuration that said configuration detector detects is not within test constraints.

13. The apparatus of claim 12 wherein said random test generating module further comprises:

a set selector module for selecting a random set of operative tasks to run on the file system configuration as the test workload.

14. The apparatus of claim 13 and in addition:

operative task detector for detecting whether the random set is within test constraints and providing a set failure indicator if said operative task detector detects the random set is not within test constraints;

said set selector module responsive to said set failure indicator for selecting a new random set of operative tasks.

15. The apparatus of claim 10 wherein said random test generating module further comprises:

a task selector for choosing a random number "m" of tasks to be performed by the file system configuration; and a operation selector for choosing a random number "n" of operations to be performed per task.

16. The apparatus of claim 15 wherein said test run module further comprises:

"m" action selector modules, each action selector module for selecting "n" random actions to be performed on the file system configuration;

"m" execution modules, an execution module cooperating with each action selector module for running "n" random actions on the file system configuration as one task; and test workload detector for detecting when all "m" execution modules have completed running each of the "n" random actions and thereafter indicating test workload complete.

17. A computer program storage medium readable by a computing system and encoding a program of instructions for executing a computer process for scatter load testing in a computer a software system, said scatter load testing being performed in test subdomains inside a test domain containing all possible configurations and operative test situations for the software system, said computer process comprising the steps of:

randomly generating a configuration for the software system to produce a software system configuration for testing;

randomly choosing a workload for the software system configuration, the workload and the software system configuration together defining an operative test situation;

detecting whether the operative test situation is within predetermined test constraints defining the test subdomain within the test domain;

repeating at least one from the group of steps comprising said randomly generating step and said randomly choosing step until said detecting step detects the operative test situation is within the predetermined test constraints defining the test subdomain; and running the operative test situation when said detecting step detects the operative test situation is within the predetermined test constraints defining the test subdomain.

18. The computer program storage medium of claim 17 wherein said computer process further comprises the steps of:

randomly selecting a plurality of workload operations as the workload in the operative test situation; and repeating at least one from the group of steps comprising said randomly generating step, said randomly choosing step and said randomly selecting step, until said detecting step detects the operative test situation is within the predetermined test constraints defining the test subdomain.

19. A computer program storage medium readable by a computing system and encoding a program of instructions for executing a computer process for scatter load testing a software system in a computer, said computer process comprising the steps of:

randomly generating a configuration for the software system to produce a software system configuration for testing;

randomly choosing a workload for the software system configuration, the workload and the software system configuration together defining an operative test situation;

randomly selecting a plurality of workload operations as the workload;

running each workload operation on the software system configuration after each workload operation is selected by said selecting step; and said step of randomly choosing a workload comprises the steps of:

first choosing a random number of tasks to be performed by the selected software system configuration; and second choosing a random number of operations to be performed per task.

20. The computer program storage medium of claim 19 wherein said computer process further comprises the steps of:

detecting whether the workload is within predetermined test constraints;

repeating said first choosing step and said second choosing step until said detecting step detects the operative test situation is within the predetermined test constraints.

21. A computer program storage medium readable by a computing system and encoding a program of instructions for executing a computer process for scatter load testing a software system in a computer, said computer process comprising the steps of:

randomly generating a configuration for the software system to produce a software system configuration for testing;

randomly choosing a workload for the software system configuration, the workload and the software system configuration together defining an operative test situation;

randomly selecting a plurality of workload operations as the workload;

running each workload operation on the software system configuration after each workload operation is selected by said selecting step; and said step of randomly generating a software system configuration comprises the steps of:

setting parameters for the software system configuration to a random set of parameters;

detecting whether the random set of parameters is within test constraints;

building the software system configuration from the random set of parameters if said detecting step detects the parameters are within test constraints;

if said detecting step detects the random set of parameters is not within test constraints, repeating said setting step until the random set of parameters is within test constraints.

22. A computer program storage medium readable by a computing system and encoding a program of instructions for executing a computer process for scatter load testing a software system in a computer, said computer process comprising the steps of:

randomly generating a configuration for the software system to produce a software system configuration for testing;

randomly choosing a workload for the software system configuration, the workload and the software system configuration together defining an operative test situation;

randomly selecting a plurality of workload operations as the workload;

running each workload operation on the software system configuration after each workload operation is selected by said selecting step; and said step of randomly selecting a plurality of workload operations comprises the steps of:

first selecting a software system object;

second selecting an action to be performed on the software system object;

third selecting action parameters for the action to be performed on the software system object to complete selection of a workload operation;

issuing the workload operation; and repeating said first, second and third selecting steps and said issuing step to issue a plurality of workload operations.

23. The computer program storage medium of claim 22 wherein said computer process further comprises the steps of:

prior to said issuing step, detecting whether the workload operation is within predetermined test constraints;

repeating said first selecting step, said second selecting step and said third selecting step until said detecting step detects the workload operation is within the predetermined test constraints.

24. A method for scatter load testing a file system in a computer with random workloads, the computer having a processor, a keyboard, and a plurality of data storage devices, said file system operating the processor and controlling the plurality of data storage devices, said processor having a central processing unit, memory and input/output control, said input/output control connected to the keyboard and data storage devices, said method comprising the computer implemented steps of:

randomly generating a file system configuration and a plurality of operative tasks for the file system configuration as a test workload for the file system;

test running the plurality of operative tasks in parallel on the file system configuration as the test workload for the file system;

said randomly generating step repeatedly generating test workloads and said test running step running the test workloads as they are generated in order to scatter load the file system with a random distribution of test workloads over a test domain of all possible test workloads for the file system.

25. The method of claim 24 further comprising the steps of:

detecting whether each operative task generated by said randomly generating step is within predetermined test constraints;

said randomly generating step responsive to said detecting step and generating a replacement operative task for each operative task that said detecting step detects is not within test constraints whereby the test workloads are distributed over test sub-domains including only a predetermined portion of all possible test workloads for the file system.

26. The method of claim 24 wherein said randomly generating step further comprises:

a configuration detecting step detecting whether the file system configuration is within predetermined test constraints;

a configuration generating step responsive to said configuration detecting step for generating a replacement file system configuration for each file system configuration that said configuration detecting step detects is not within test constraints.

27. The method of claim 26 wherein said randomly generating step further comprises:

selecting a random set of operative tasks to run on the file system configuration as the test workload.

28. The method of claim 27 further comprising the steps of:

an operative task detecting step detecting whether the random set is within test constraints and providing a set failure indicator if said operative task detecting step detects the random set is not within test constraints;

said selecting step responsive to said set failure indicator for selecting a new random set of operative tasks.

29. The method of claim 24 wherein said randomly generating step further comprises the steps of:

a task selecting step choosing a random number "m" of tasks to be performed by the file system configuration; and     an operation selecting step choosing a random number "n" of operations to be performed per task.

30. The method of claim 29 wherein said test running step further comprises the steps of: "m" action selecting steps, each action selecting step selecting "n" random actions to be performed on the file system configuration;

"m" executing steps, an executing step cooperating with each action selecting step for running "n" random actions on the file system configuration as one task; and     a test workload detecting step for detecting when all "m" executing steps have completed running each of the "n" random actions and thereafter indicating test workload complete.

\* \* \* \* \*

UNITED STATES PATENT AND TRADEMARK OFFICE
CERTIFICATE OF CORRECTION

PATENT NO. : 5,675,731
DATED : October 7, 1997
INVENTOR(S) : Billy J. Fuller

It is certified that error appears in the above-identified patent and that said Letters Patent is hereby corrected as shown below:

Column 8, line 45, change "a operation" to
--an operation--

Column 12, line 28, the first listed step beginning with "'m' action" should be a separate paragraph Signed and Sealed this Tenth Day of March, 1998

Attest:

BRUCE LEHMAN

Attesting Officer

Commissioner of Patents and Trademarks